March 29, 1949.　　　R. P. HELLING　　　2,465,452
LATCH MECHANISM
Filed April 23, 1946　　　　　　　　　　　　2 Sheets-Sheet 1

Raymond P. Helling
INVENTOR.

BY
HIS PATENT ATTORNEY

March 29, 1949.  R. P. HELLING  2,465,452
LATCH MECHANISM
Filed April 23, 1946  2 Sheets-Sheet 2
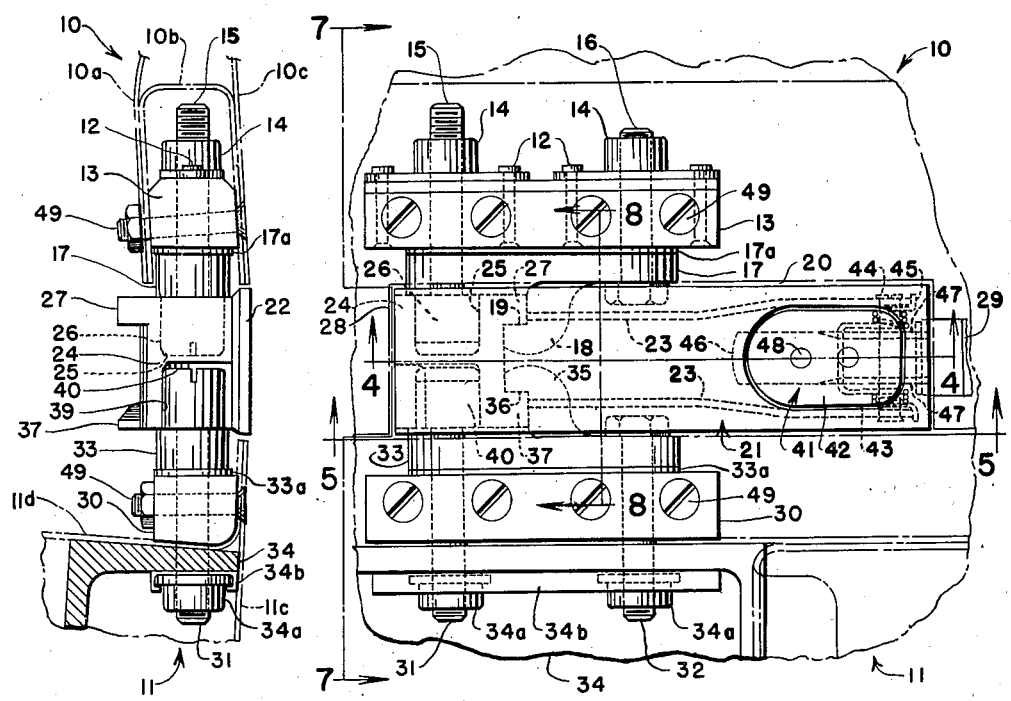
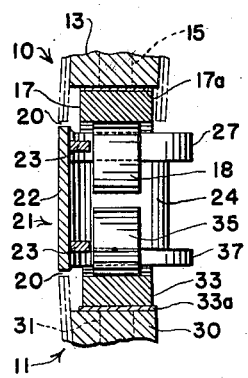
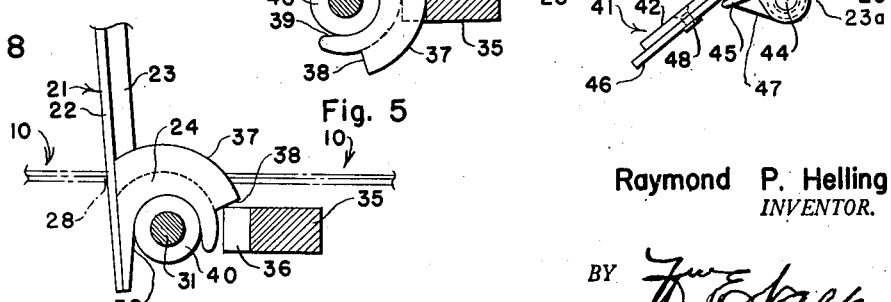
Raymond P. Helling
*INVENTOR.*
BY *[signature]*
HIS PATENT ATTORNEY Patented Mar. 29, 1949

2,465,452

UNITED STATES PATENT OFFICE 2,465,452

LATCH MECHANISM

Raymond P. Helling, St. Louis, Mo., assignor to Curtiss-Wright Corporation, a corporation of Delaware Application April 23, 1946, Serial No. 664,239

5 Claims. (Cl. 292—241)

The present invention relates generally to latches and closure fasteners, and more particularly to improvements therein for securing relatively movable closure panels and like elements.

This invention is primarily directed to the provision of a latch which is especially adapted for use with aircraft cowl panels and similar relatively movable parts. Such closures and panels, when used in aircraft and other high-speed vehivles, are required to be fastened or secured in their closed positions in an absolutely flush and rigid relationship in order that the adjoining panels present a smooth and continuous surface to the airstream; and are also required to be secured against coming loose due to vibration and the numerous forces to which the panels and their supporting structure may be subjected. Inasmuch as such closures are subjected to forces in a number of directions, it is required that the latching means securely maintain the panel against movement in any of these directions.

It is accordingly a primary object of the present invention to provide an improved latch or lock for relatively movable closures or panels and which is more particularly adapted for the securement of aircraft cowl panels. It is a further object to provide an improved latch of the type which will both align and secure the panels simultaneously in several different directions. Another objective is directed to such a cowl latch which is self-locking by means of a catch carried thereby and requires no tools for the locking or unlocking operations.

A further object resides in the provision of a latch of this type which will draw the relatively movable panels closely together in a properly aligned relationship as it is closed to present a flush and continuous outer surface in its fully closed position. A still further object of the present invention resides in the provision of an improved latch which embodies no loose parts as well as one which will not work loose under the severe vibration conditions to which such aircraft components are subjected. Another objective contemplates providing a latch or fastener of the flush type which is simple, sturdy and foolproof in its operation.

Other objects and advantages of the present invention will become apparent to those skilled in the art after reading the following description taken together with the accompanying drawings forming a part hereof, in which:

Fig. 3 is an elevational view of the latch and its associated parts as viewed from the outside of the cowl with the panel covering shown in phantom;

Fig. 4 is a sectional view as taken along the line 4—4 of Fig. 3;

Fig. 5 is a sectional view as taken along the line 5—5 of Fig. 3;

Fig. 6 is a fragmentary view of the latch pivot taken at the same section as Fig. 5, but showing the latch in its open position;

Fig. 7 is a transverse section as viewed along the line 7—7 of Fig. 3; and

Fig. 8 is a transverse section as taken along the line 8—8 of Fig. 3.

Figure 1:
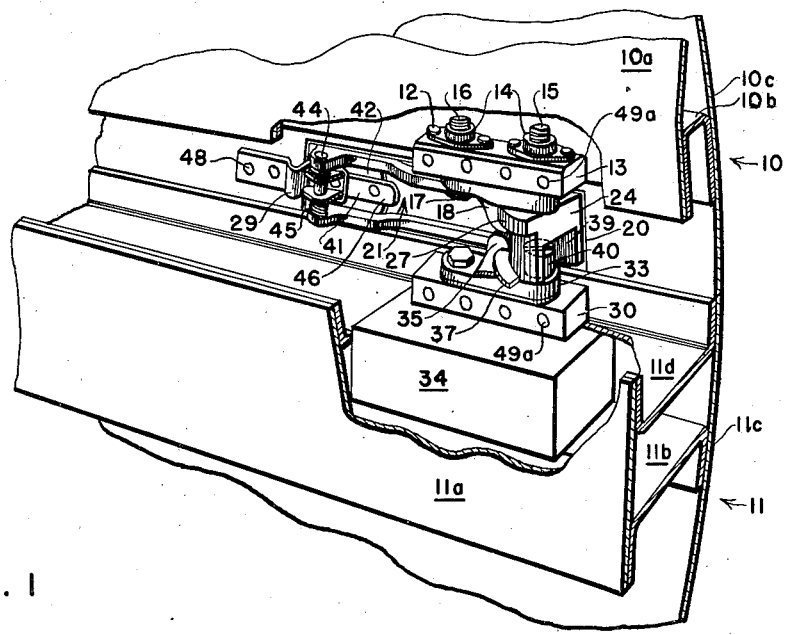
Fig. 1 is a perspective view of the improved latch in its closed or secured position, with certain of the surrounding parts of the structure broken away for clarity and as viewed from the inside of an aircraft cowl section.
Figure 2:
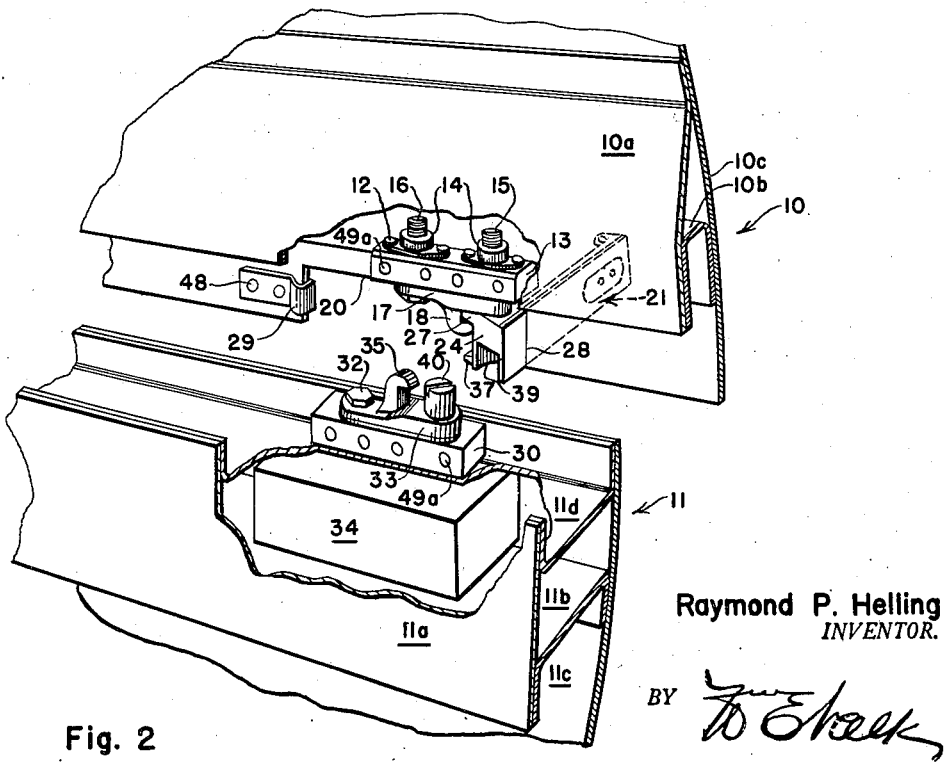
Fig. 2 is a similar view showing both the latch and the cowl panel or closure partially open.

Referring now to Figs. 1 and 2, the present invention is shown applied to a relatively movable cowl panel or closure section 10 mounted upon cowl supporting structure 11 which may be relatively fixed with respect to the aircraft. It will be understood that the movable panel 10 is hinged or pivotally mounted in a well known manner at its opposite edge (not shown) to the cowl supporting structure 11 in order that the movable latch-carrying portion of the panel may be moved outwardly from the fixed structure 11 to provide access through the opening therein. The panel 10 may be constructed of a backing sheet 10a, a channel frame 10b and the outer skin covering 10c.

Secured within the channel member 10b adjacent the latch-carrying edge of the movable panel 10, there is provided a mounting block 13 having anchor or plate nuts 14 secured thereto by the rivets 12 and suitably threaded to receive a stud 15 and a bolt 16 for securely attaching the fitting 17, and the intermediate filler piece or shim 17a, to the panel 10. The fitting 17 has a hooked-shaped detent or projection 18 providing upon its inner surface a bearing face 19.

As more particularly shown in Fig. 2, the movable cowl panel 10 is provided with a recess or cut-out portion 20 open to its outer edge and of a size and shape to receive the latch arm assembly 21 in a normally flush relationship with the outer surface 10c of the closure panel 10. The latch arm 21 comprises a welded assembly including a flat plate 22 forming a continuous outer surface with the cowl and a pair of ribs 23 extending substantially through its length and welded to a bifurcated hub portion 24, the ribs 23 having apertured ears or lugs at 23a. The arm 21 is bored at 25 to fit over the head portion 26 of the stud 15, which serves as a pivot means, and also has an annularly extending flange or collar 27 which engages the open end of the hook projection 18.

It will be noted that with this relationship of the parts, the latch arm 21 may be rotated about the axis of the stud 15 while at the same time being maintained in its assembled relationship with the panel 10 by engagement of the flange 27 with the hook 18. The angular movement of the latch arm 21 about the stud 15 is limited when swung outwardly by its contact with the edge portion 28 of the cut-out 20 in the panel 10 as more clearly shown in Fig. 6, and its movement into the closed flush position is defined by the detent or strike element 29 secured to the inner face of the panel as more clearly shown in Figs. 4 and 5.

The supporting cowl structure 11 is of built-up box, or composite, construction, having a backing plate 11a, framing channels 11b and 11d, and skin covering 11c. It has suitably secured to an inner portion thereof, as may be seen in Fig. 3, mounting blocks 30 and 34 which are bored to receive a stud 31 and a bolt 32 for the attachment of the fitting 33 and the intermediate shim 33a. Channel nuts 34a, as shown in Fig. 7, are secured to the structure 11 and the intermediate channel strips 34b, and receive the threaded ends of the stud 31 and the bolt 32. The fitting 33 is similar to the opposed upper fitting 17 and has a similar hook-shaped projection 35 which, however, differs in that its bearing face 36 is inclined or sloped to engage a similarly inclined cam face of the annular wedge 37 projecting outwardly from the hub 24. The wedge 37 is relieved or cutaway at one end as at 38 to clear the projection 35 when the latch arm is in the open position as shown in Fig. 5 to permit initial lateral movement of the unlatched panel part.

Aligned with the hooked projection 35, but opposite thereto in the closed position of the arm 21, there is an opening or notch 39 in the side wall of the hub 24 having tapered entrance walls and of a size to permit engagement with the head portion 40 of the stud 31. Upon closing the panel 10, and with the latch arm 21 in the open position as shown in Fig. 6, the tapered side walls of the notch or slot 39 will align with and engage the head 40 of the stud 31 and center the parts longitudinally with respect to the normal position of the latch and the panel to which it is attached. Thereafter, manual rotation of the latch arm 21 about the axis of the stud 15, and its head portion 26, will cause the cammed wedge 37 to engage the face 36 of the projection 35 and bring the part into lateral alignment by the camming action of this wedge and the working face of the projection by movement of the entire panel 10 in the direction of the axis of the stud 15 and toward the supporting structure 11. This rotation of the latch arm will also bring the panel 10 into the same plane, or flush contour of the supporting structure skin 11c, by the action of the tapered slot 39 in engagement with the head 40 of the stud 31, thus completing the alignment of the panel 10 with the surrounding structure in three different planes or directions.

In order to maintain the arm 21 in its latched or closed position there is provided a catch lever 41 having an outer plate 42 secured to the outer face of the lever extension 46 for flush positioning within an opening 43 in the latch arm plate 22. The outer plate 42 may be riveted to the inner plate 46 by the rivets 48 to form the catch assembly 41. The catch lever extension 46 has a pair of extending leg portions 47 which are apertured to pivotally engage a pin 44 carried by the pair of apertured ear portions 23a formed at the outer ends of the arm ribs 23. A pair of torsion springs 45 are interposed between each ear 23a and the lever 41 to urge the latter into its closed position as limited by the engagement of the lever extension 46 with the back of the plate 22 of the latch arm 21.

The edge of the leg portions 47 is contoured to form a cam surface which engages an angular face of the detent 29 to retain the latch arm 21 in its closed position. Pressure exerted by an operator's finger on the lever plate 42 rotates the lever 41 inwardly to the position shown in Figs. 4 and 5 to move the catch portions 47 out of the path of the detent 29 to allow opening or releasing movement of the latch arm 21. Rotation of the arm 21 in the opposite direction, in order to close the cowl panel 10 after it has been rotated to a position where the head 40 of the stud 31 engages the hub 24 as taperingly recessed at 39, permits the arm 21 to be latched into its flush position merely by pressure against its plate portion 22. Continued pressure on the plate 22 causes the camming portions 47 of the lever extension 46 to be rotated against the pressure of the springs 45 by virtue of their engagement with the detent 29 and as the lever 21 reaches its limit position the springs return the arm 41 to its locked position in which the cowl panel 10 is secured against movement. The upper and lower stud or pin assemblies are attached to the respective panel and structure skin by the countersunk head bolts 49 passing through the holes 49a in the mounting blocks 13 and 30.

It will accordingly be noted from the foregoing description that the improved latch of the present invention is capable of effectively aligning the movable cowl panel, when it may be necessary, in a plurality of different directions with respect to the supporting structure which contributes to bringing the panel into the same final flush position as the latch arm 21 is closed and locked. It should be noted that the opposed co-axial studs 15 and 31, carried by the movable and fixed parts, respectively, serve as a pair of divided or separable trunnions which the latch arm aligns and rotates about. As indicated above, the initial engagement of the tapered opening 39 in the hub 24 centers the panel 10 longitudinally or across the axis of the studs 15—31, rotation of the latch arm 21 and engagement of the wedging flange 37 with the working face 36 of the hook projection 35 tends to move the panel 10 in the direction parallel to the axis of the studs 15—31 in which the edges of the panel and the adjacent supporting structure 11 are brought together in an abutting relationship. And as the arm 21 is rotated further into its flush or closed position the two foregoing positions are maintained together with the flush relationship of the panel and adjacent structure as determined by the maintenance of the axis of the pivot studs 15—31 centrally aligned with the axis of the hub 24. Each of these movements is accomplished automatically and without difficulty by the relatively simple operation of the present latch arm which in its closed position is perfectly flush with the adjacent structure and has no projections by which it may foul or interfere with moving objects, the catch assembly 41 preventing its being jarred into an open position due to vibration of the cowl structure.

Other forms and modifications of the present invention both with respect to its general arrangement and the details of its respective parts which may occur to those skilled in the art after an understanding of the foregoing description and drawings are all intended to come within the scope and spirit of the present invention as more particularly defined in the appended claims.

I claim:

1. In a latching mechanism, a movable member, a relatively fixed member, a pivot element carried by said movable member, a second pivot element carried by said fixed member co-axially aligned with said first pivot element in a predetermined relationship of said members with respect to each other laterally of the said aligned pivot axes, a detent carried by said fixed member, lever means rotatably carried by said first pivot element engageable with said second pivot element for maintaining said predetermined relationship of said members laterally of the said aligned pivot axes, and a cam element carried by said lever means engageable with said detent for drawing said members together in the axial direction of said pivot axes upon rotation of said lever means.

2. In a latching mechanism a movable member, a relatively fixed member, a pivot element carried by said movable member, a second pivot element carried by said fixed member and co-axially aligned with said first pivot element in a predetermined relationship of said members with respect to each other laterally of the said aligned pivot axes, a detent carried by said fixed member, rotatable means pivotally carried by said first pivot element engageable with said second pivot element for maintaining said predetermined relationship of said members laterally of the said aligned pivot axes, a cam element carried by said rotatable means engageable with said detent for drawing said members together in the axial direction of said pivot axes upon rotation of said rotatable means, and locking means carried by said rotatable means engageable with one of said members arranged to prevent movement of said rotatable means.

3. Latching mechanism for fixing the relationship between a movable panel and a fixed supporting structure comprising pivot means carried by said movable member, a detent carried by said movable member spaced from the axis of said pivot means, a second pivot means carried by said supporting structure, a second detent carried by said supporting structure spaced from said second pivot means, an arm rotatably engaging said first pivot means, said arm having a flange portion engageable with said first detent to prevent separation of said arm from said first pivot means in the axial direction, said arm being apertured for engagement in a radial direction with said second pivot means, said arm having a tapered flange portion engageable with said second detent arranged in such manner that with the said arm in its open position said movable member is adapted for movement into an aligned position with said supporting structure in which said arm embraces said second pivot means and rotation of said arm toward its closed position initiates engagement of said tapered flange portion with said second detent and the drawing of said movable member toward said supporting structure in the axial direction of said aligned pivot means.

4. A latching mechanism for a movable closure panel mounted upon a supporting structure, pivotal means carried upon said closure panel, said closure panel having a cut-out portion along an edge adjacent said supporting structure, a latch arm having a hub portion suitably apertured to receive said closure panel pivot means for rotation about the same, said latch arm substantially filling said cut-out edge portion in its engaged position, retaining means carried by said hub portion engageable with said closure panel to prevent separation in the axial direction of said hub portion from said pivot means, a second pivot means carried by said supporting structure axially aligned with said first pivot means in the closed position of said panel, said hub portion apertured for engagement with said second pivot means so arranged that movement of the panel into closed position with said arm in open position permits engagement of its hub portion wtih said second pivot means and rotation of said arm about the axis of both said pivot means prevents separation of said second pivot means from said hub portion and securement of said panel to said supporting structure.

5. A latching mechanism for a closure panel in a supporting structure, said closure panel and supporting structure having closely abutting flush outer surfaces, a cut-out portion within said abutting edges, a latching element adapted to fit within said cut-out portion in its closed flush position, trunnion pivots carried by said panel and supporting structure and arranged to align axially in the closed position of said panel, said latching element having a hub portion pivotally engaged with one of said trunnion pivots, said latching element having a slotted hub portion engageable with said second trunnion pivot, a detent carried by said supporting structure having a sloping bearing surface, a camming portion carried by said latching element engageable with said bearing surface arranged in such manner that closure of said panel with said latching element in open position and engagement of said supporting structure trunnion pivot with said slotted hub portion centers said panel laterally of said trunnion axis, and rotation of said latching element and engagement of said camming surface draws said panel and supporting structure together along said abutting edges and prevents separation of said panel from said supporting structure in any direction.

RAYMOND P. HELLING.

REFERENCES CITED

The following references are of record in the file of this patent:

UNITED STATES PATENTS

| Number | Name | Date |
| --- | --- | --- |
| 1,782,896 | Hoffman | Nov. 25, 1930 |

FOREIGN PATENTS

| Number | Country | Date |
| --- | --- | --- |
| 723,309 | France | Sept. 24, 1931 |